(12) United States Patent
Hart, II et al.

(10) Patent No.: US 8,078,992 B2
(45) Date of Patent: Dec. 13, 2011

(54) RENDERING A CUSTOMIZED LIST OF CONTROLS

(75) Inventors: John W. Hart, II, Bellevue, WA (US); John Z. Chen, Woodinville, WA (US); Yun Feng Dong, Shanghai (CN); Antoine Cote, Shanghai (CN); Tao Shen Hu, Shanghai (CN); Wenhui Zhu, Shanghai (CN); Paul J. Yuknewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 12/212,660

(22) Filed: Sep. 18, 2008

(65) Prior Publication Data

US 2010/0070924 A1 Mar. 18, 2010

(51) Int. Cl.
*G06F 3/048* (2006.01)
(52) U.S. Cl. .................. 715/810; 715/784; 715/968
(58) Field of Classification Search .................. 715/968, 715/204, 221, 224–226, 780, 781
See application file for complete search history.

(56) References Cited

U.S. PATENT DOCUMENTS

| | | | | |
|---|---|---|---|---|
| 5,892,510 A * | 4/1999 | Lau et al. | | 715/866 |
| 6,128,012 A | 10/2000 | Seidensticker, Jr. et al. | | |
| 6,832,351 B1 | 12/2004 | Batres | | |
| 6,907,575 B2 * | 6/2005 | Duarte | | 715/784 |
| 6,959,425 B1 | 10/2005 | Krauklis | | |
| 7,170,491 B2 * | 1/2007 | Montalcini | | 345/157 |
| 7,216,291 B2 | 5/2007 | Kim | | |
| 7,441,207 B2 * | 10/2008 | Filner et al. | | 715/864 |
| 7,451,407 B2 * | 11/2008 | Brodie et al. | | 715/828 |
| 7,620,908 B2 * | 11/2009 | Klevenz et al. | | 715/781 |
| 7,710,393 B2 * | 5/2010 | Tsuk et al. | | 345/156 |
| 2004/0119753 A1 * | 6/2004 | Zencke | | 345/786 |
| 2005/0066291 A1 * | 3/2005 | Lewak | | 715/810 |
| 2005/0114790 A1 * | 5/2005 | Dunbar et al. | | 715/785 |
| 2005/0183040 A1 * | 8/2005 | Kondo et al. | | 715/841 |
| 2006/0048045 A1 | 3/2006 | Lehenbauer et al. | | |
| 2006/0064649 A1 * | 3/2006 | Weber et al. | | 715/811 |
| 2007/0245306 A1 | 10/2007 | Dameshek et al. | | |
| 2007/0266331 A1 | 11/2007 | Bicker et al. | | |
| 2008/0307298 A1 * | 12/2008 | Matveief et al. | | 715/224 |

OTHER PUBLICATIONS

"DataRepeater Class", Retrieved at<<http://msdn.microsoft.com/en-us/library/microsoft.visualbasic.powerpacks.datarepeater(VS.80).aspx>>, Aug. 1, 2008, pp. 3.
"Filtering and Formatting Data in the DataGrid Component", Retrieved at<<http://www.adobe.com/devnet/flash/quickstart/datagrid_pt3/>>, Aug. 1, 2008, pp. 21.

* cited by examiner

*Primary Examiner* — Weilun Lo
*Assistant Examiner* — Amy M Levy

(57) ABSTRACT

Form controls can be reused so that the control can be bound to large volumes of data without adverse performance issues because of a large number of controls. A maximum number of rows of data N that can appear in a form are calculated. A container in memory is created for N+2 rows. The additional two rows are used to store the row after the last displayed row and the row previous to the first displayed row. In response to a user scroll or tab operation, rows within the container are reused. Child controls are hosted by the control and are also reused when the data is scrolled out of view.

19 Claims, 6 Drawing Sheets

| Form1 | | | X |
|---|---|---|---|
| 1 of 91 | | | |

302

- Customer ID — ALFKI 312 — Region — [ ]
- Company Name — Alfreda 322 — Postal Code — 12209
- Contact Name — Maria Ander — Country — Germany
- Contact Title — Sales Rep — Phone — 030 000 0000
- Address — Obere Str. 57 — Fax — 030 000 0001
- City — Berlin

304

- Customer ID — ANATR 314 — Region — [ ]
- Company Name — Ana Trulo Co — Postal Code — 05021
- Contact Name — Ana Trulo — Country — Mexico
- Contact Title — Owner — Phone — 5550 00 3434
- Address — Avda Consti — Fax — 5550 00 3435
- City — Mexico DF

306

- Customer ID — ANTON 316 — Region — 316
- Company Name — Antonio Mar — Postal Code — 05033
- Contact Name — Antonio Mar — Country — Mexico
- Contact Title — Sales Rep — Phone — 5550 00 6767
- Address — 34 Caladia St — Fax — 5550 00 6769
- City — Mexico DF

RENDERING A CUSTOMIZED LIST OF CONTROLS

BACKGROUND

A user interface is a computer program that allows a user to interact with a computer and computer-controlled devices. A graphical user interface or GUI presents graphical icons, visual indicators or graphical elements, sometimes in conjunction with text, labels or text navigation, to represent information and actions available to the user. Instead of offering only text menus, or requiring typed commands, an action is usually performed through direct manipulation of graphical interface elements.

A control is an interface element with which the user interacts, such as a window or a text box. A control provides a single interaction point for the direct manipulation of a particular kind of data. Controls are building blocks for user interfaces. When combined in an application, controls hold the data processed by the application and control the available interactions on the data. Controls are typically objects that are contained within form objects. Each type of control object has its own set of properties, methods, and events that make it suitable for a particular purpose. Controls can frequently be manipulated in a designer and code can be written to add controls dynamically at run time.

Generic controls are often packaged into toolkits. The controls in the toolkits are used by programmers to build graphical user interfaces (GUIs). Most operating systems include a set of customizable controls that a programmer can incorporate into an application. Each type of control generally is defined as a class by object-oriented programming (OOP). Therefore, many controls are derived via class inheritance.

A grid view or a datagrid is a graphical user interface control that presents a tabular view of data. Some toolkits distinguish between a grid and a datagrid. If this is the case, the term datagrid refers specifically to a control that can be linked to a data source such as a database, a web service or any other type of data source with little or no effort on the part of a programmer. One common use of a datagrid is displaying lists of products on a web site or displaying lists of files, such as, for example, in the "Details" view in Windows XP file managers. Grid views are sometimes referred to as spreadsheet controls because a grid view may visually resemble a spreadsheet application.

Some existing grid-type controls allow a developer to display rows of data. These controls can be bound to very large data sources but doing so may cause severe performance issues because each row of data can itself contain several fields and each field is typically displayed in a separate control. Thus the total number of controls can very quickly add up. For example, if there were 10,000 rows of data in a data source with 20 fields of data in each row, the number of controls created to display this data could be over 200,000.

SUMMARY

Large volumes of data can be displayed quickly without creating in memory one row for each and every row of data from the data source, where each row comprises a plurality of controls. Form controls are reused so that large volumes of data can be displayed quickly by creating a scrollable container of at most N+2 rows of forms controls, where N is the number of rows visible on the form at a particular point in time. Rows can be reused when the user scrolls or tabs through the data or when the used activates a page down or page up feature. Fields within a row of data are hosted child controls. Child controls can also be reused.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 3 is another example of a screen shot of a customized list of controls in accordance with aspects of the subject matter disclosed herein;

DETAILED DESCRIPTION

Overview

Figure 1:
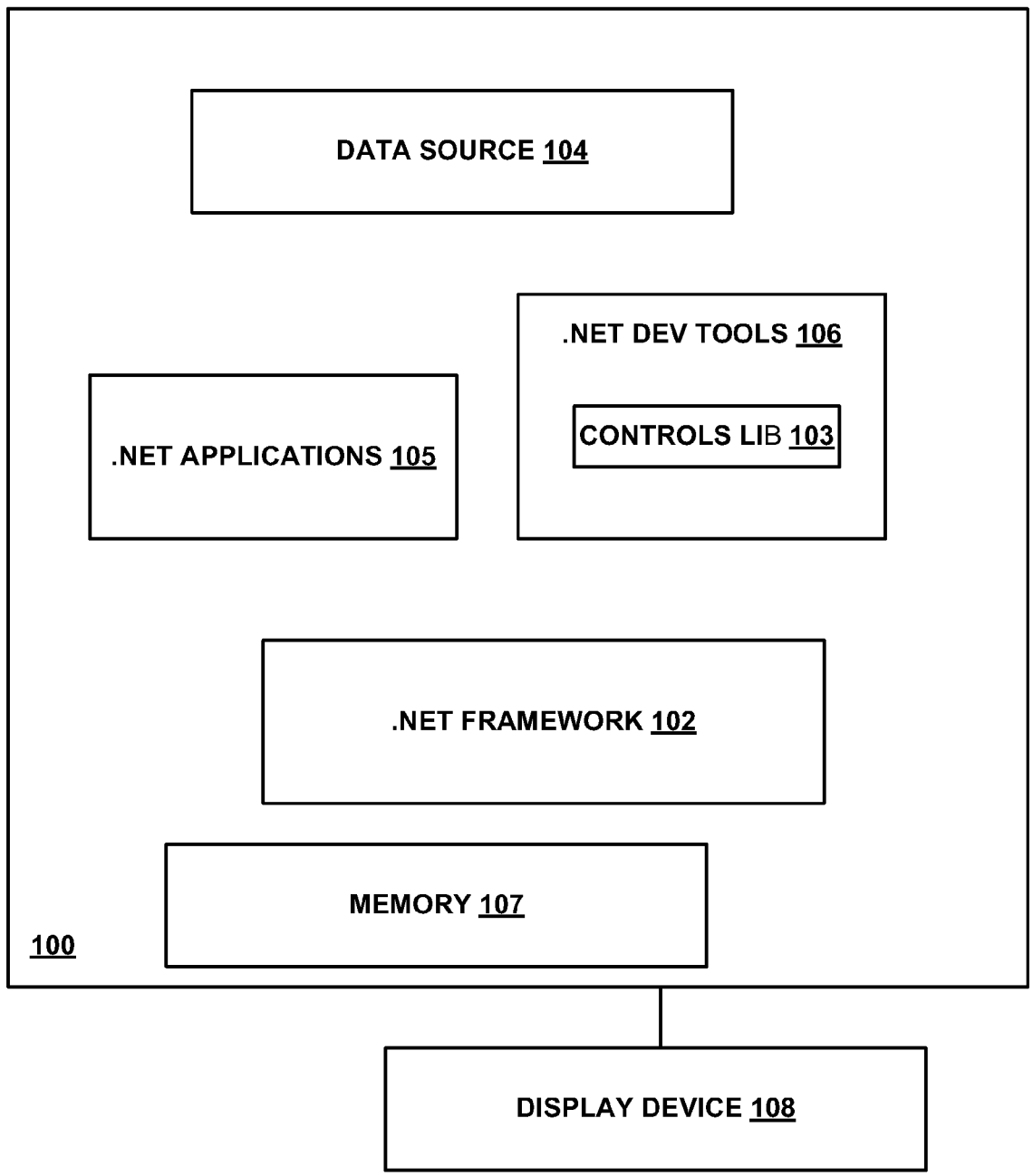
FIG. 1 is a block diagram of an example of a system for rendering a customized list of controls in accordance with aspects of the subject matter disclosed herein.

A graphical user interface application programming interface (API) is typically included in a managed code framework or environment to enable access to native code interface elements (controls). Typically, native code interface elements (including controls such as grid controls) are wrapped in managed code to allow developers to create a grid control using managed code controls. For example, Windows Forms is the name given to the graphical user interface application programming interface (API) included as a part of Microsoft's .NET Framework. Windows Forms provides access to the native Microsoft Windows interface elements by wrapping the existing Windows API in managed code. Similarly, AWT provides an analogous function in a JAVA environment Other controls (including grid controls) are written in managed code.

One known grid-style control allows developers to create a customized display using standard managed code controls to display each row of data of a data source on a form. The control can be bound to very large data sources but doing so may cause severe performance issues. The reasons that there are likely to be performance issues is that traditionally one or more controls are created in memory for each row of data so that if a data source contains 1 million rows of data, at least 1 million controls are created in memory. Furthermore, each row can itself contain a number of fields and traditionally each field will be displayed in a separate control. Thus, even for relatively small data sources, the total number of controls can very quickly add up. For example if there were 10,000 rows of data with 20 fields in each row, 200,000 controls (or more) would be created to display this data. Some grid-style controls are not scrollable. Although data from the previous or next row in the data source can be displayed by clicking the up and down arrows on the scroll bar, (e.g., using a fixed, none scroll pattern), the controls themselves are not scrolled or scrollable, only the data within the control is scrolled.

To address the issues described above, a new type of grid control called a data repeater control has been developed which reuses form controls so that large volumes of data can be displayed by creating at most N+2 rows of forms controls in memory, where N is the number of rows visible on the form in its initial size. If M is the number of rows of data in the data source, it is likely that N is a far smaller number than is M. Rows are reused when the user scrolls or tabs through the data or when the user activates a page down or page up feature. Child controls hosted by the data repeater control are created and are also reused.

When the data repeater control is first displayed, for example on a Windows Form, the number of rows (known as data repeater items) that will fit on the form are calculated. A data repeater item is created in a scrollable container in memory for each row that can be displayed on the form at one time. Each data repeater item can also include a child control for each field in the row to display the contents of the data. Two additional data repeater items may be created to be used when the user scrolls or tabs through the data so that adjacent rows of data can be quickly displayed. When the data is scrolled up or down the data repeater items are scrolled in the same direction. When a data repeater item is scrolled out of view it, along with its hosted child controls, are then reused to display the row of data (either a previous row or a next row) that is scrolling into view. This allows the data repeater to need at most N+2 rows of data repeater items and their associated child controls to be created in memory at one time instead of needing one row (comprising a plurality of controls) for each row of data in the data source to be created in memory at one time. A container of N+1 data repeater items can be created in memory when the row requested is a first row or last row of the data source. A data repeater control as described may enable a user to use standard Windows Forms controls instead of custom painted cells/rows, permitting the user to leverage his knowledge of familiar APIs.

Rendering a Customized List of Controls

FIG. 1 illustrates a block diagram of a system 100 for rendering a customized list of controls. System 100 may include one or more of the following: a processor (not shown), a memory 107, a display device 108, a managed code framework 102, a data source 104, an application written in a managed code language 105, managed code development tools 106 including a forms control library 103. All or portions of system 100 may reside on one or more computers such as the computers described below with respect to FIG. 5. The system 100 or portions thereof may comprise a portion of an integrated design environment 600 (IDE) such as the ones described and illustrated below with respect to FIG. 6, residing on one or more computers such as the computers described with respect to FIG. 5 also described below. Alternatively, system 100 or portions thereof may be provided as a stand-alone system or as a plug-in.

A managed code framework 102 may comprise a .NET framework or a JAVA framework or any other managed code framework or environment. The data source 104 may comprise any data source such as a web service, database, file, etc. The application may be written in any managed code language or may be written in a native code language and a managed code add-in may provide an interface between the native code application and the managed code controls. A forms control library 103 may include a data repeater control as described more fully herein.

Figure 2:
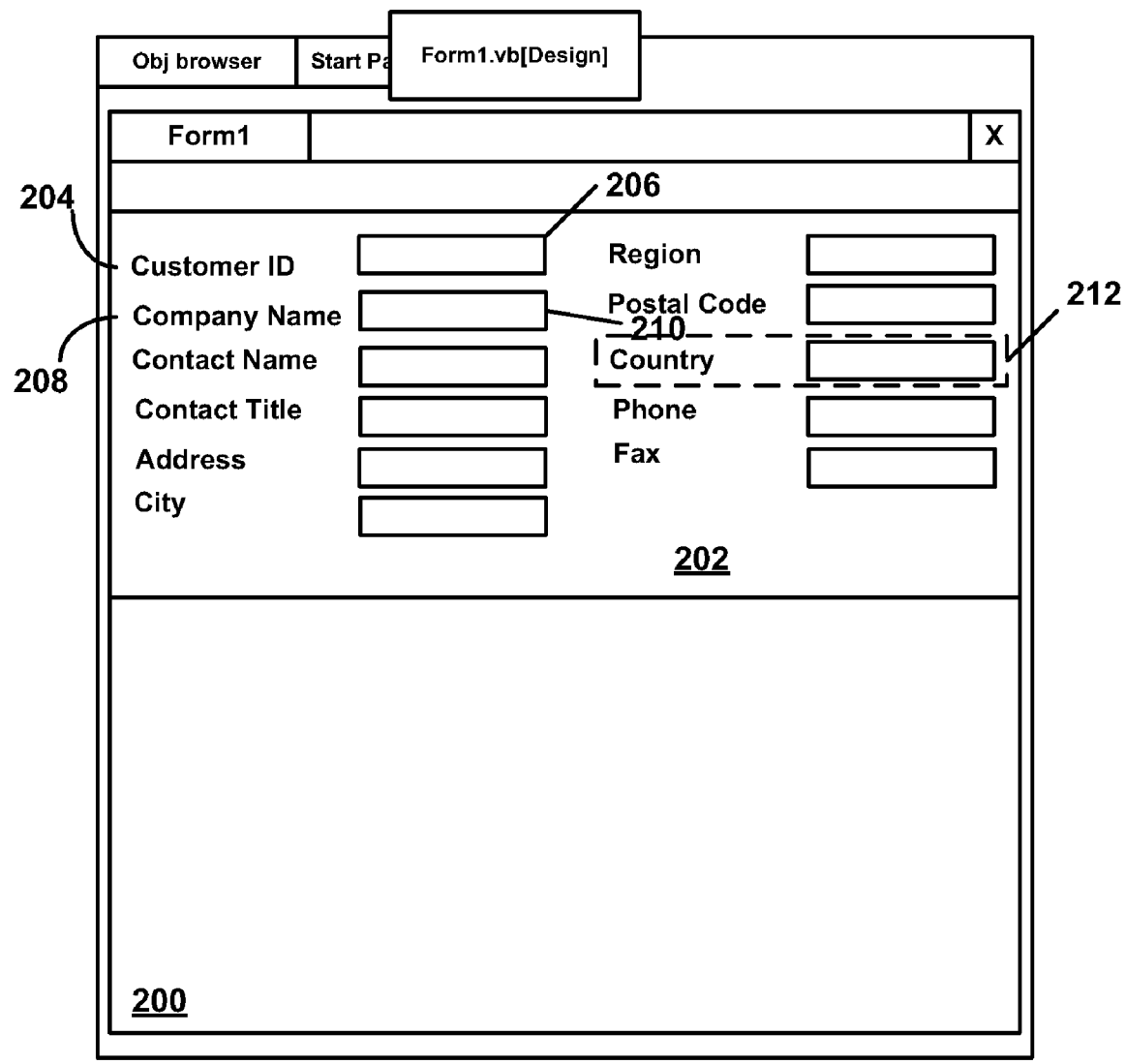
FIG. 2 is an example of a screen shot of a customized list of controls in accordance with aspects of the subject matter disclosed herein.

FIG. 2 is an example of a screen shot of a customized list of controls in accordance with aspects of the subject matter disclosed herein. In FIG. 2, form 200 represents a layout for a row of data of a data source at it may appear during a design phase. Form 200 may be customized to represent the content of the data source to be displayed. Data repeater item 202 thus may be a row of data of a data source which includes Customer ID data, Company Name data, Contact Name data, Contact Title data, Address data, City data, Region data, Postal Code data, Country data, Telephone data and Fax data. It will be appreciated that a data repeater item 202 may be generated for any data source and is not limited to the labels and text boxes shown in the example form. In form 200, Customer ID 204 is a label for a child text box control 206 that displays Customer ID data. Company Name 208 is a label for a child text box control 210 that displays Company Name data and so on. Each child text box control in form 200 is a child control of the data repeater item 202 control because each child text box control is hosted by the data repeater item 202. In addition, each label such as Customer ID 204, Company Name 208 and so on may themselves be controls.

During a design phase, a developer or other user may generate a customized data repeater control by dragging and dropping a data repeater control from a control library (e.g., control library 103) onto the form and dragging and dropping data source components to the data repeater item template. In response, the data repeater control automatically (programmatically) populates child controls for every field in the data source on the form. This capability provides a one-step WYSIWYG ("What You See Is What You Get") user experience. That is, a data repeater control can be dragged and dropped onto a form, a data source associated with the data repeater control and the data binding happens automatically at runtime. In contrast, in known controls, a separate user control was created and associated with a data source for each field to be displayed in the grid. On a separate form, the user controls acting as templates were used to create the grid, a two-step process in which the developer or user had to switch back and forth between the form and templates.

In accordance with aspects of the subject matter disclosed herein, unwanted field(s) in the data source can be removed from the data repeater template by deleting the associated child control(s) of the data repeater control. For example, in form 200, a field in the data row, such as Country can be removed from the data repeater item 202 by deleting the child controls 212 associated with the Country field from the data repeater template. Unlike known grid-style controls in which control types are limited, (for example, a text box had to be used for a string data type), no limitation is placed on the type of the control associated with the data type. For example, although Customer ID data may be of data type "string" the control used to display the Customer ID data is not restricted to a textbox. At runtime, the data repeater control will automatically (programmatically) determine the data source bound to the control. Different data formats can be chosen in which the data is displayed in the control. For example, to display a column of date/time type, formats such as 12/31/1981 14:23:51, Dec. 31, 1981 2:23:51 pm, etc. may be selected for display.

FIG. 3 illustrates an example of a screen shot of a customized list of controls in accordance with aspects of the subject matter disclosed herein. In FIG. 3, display 300 represents a display of three rows of data of a data source at it may appear during a runtime or execution phase. Display 300 may be customized during a design phase to represent the content of the data source to be displayed as described above. Data repeater items 302, 304 and 306 thus may display three rows of a data source which includes Customer ID data, Company Name data, Contact Name data, Contact Title data, Address data, City data, Region data, Postal Code data, Country data, Telephone data and Fax data. It will be appreciated that a data repeater item such as data repeater items 302, 304 and 306 may be generated for any data source and are not limited to the controls or data fields shown in the example form. In display 300, Customer ID 308 is a label for a child text box control 310 that displays Customer ID data (e.g., ALFKI 312 for data repeater item 302, ANATR 314 for data repeater item 304 and ANTON 316 for data repeater item 306), Company Name 318 is a label for a child text box control 320 that displays Company Name data (e.g., Alfreda 322 for data repeater item 302, Ana Trulo Co 324 for data repeater item 304 and Antonio Mar 326 for data repeater item 306 and so on).

Each child control, (e.g., child text box control 310, child text box control 320, etc.), in data repeater item 302 of display 300 is a child control of the data repeater item 302 because each child control is hosted by the data repeater item 302. In addition, each label (e.g., child control label Customer ID 308, child control label Company Name 318), in data repeater item 302 and so on may themselves be controls. Similarly, each child control in data repeater item 304 of display 300 is a child control of the data repeater item 304 because each child control is hosted by the data repeater item 304 and so on.

At runtime the control takes the template developed during the design phase (e.g., displayed in FIG. 2) and repeats it for each row in the data source displayed on the screen (e.g., as displayed in FIG. 3). A row is not created in memory for each row in the data source. Instead a maximum of N+2 rows of data repeater items are created in a scrollable container in memory, where N represents the number of rows displayed on the screen.

For example, in display 300, three (N) rows of data of the data source are displayed using three data repeater items so that a maximum of five (N+2) data repeater items are stored in memory. These five rows of data repeater items in memory can be reused whenever a user scrolls down or up or tabs to the next or previous row or data repeater item. Similarly the child controls for each data repeater item can be reused. Suppose for example, the three rows displayed in display 300 by the three data repeater items 302, 304 and 306 represent the following rows of data in the data source: row 40 (displayed by data repeater item 302, row 41 (displayed by data repeater item 304) and row 42 (displayed by data repeater item 306). The two additional data repeater items would be populated in memory with the data from row 39 (the row previous to row 40) and row 43 (the row after row 42), although these rows of data are not visible on the display 300.

Thus, if a user were positioned on row 42 and tabbed to the next row, row 43 would scroll into view, row 40 displayed by data repeater item 302 would disappear from the display window, row 41 displayed by data repeater item 304 and row 42 displayed by data repeater item 306 would be displaced upwards on the display one item each and row 43 displayed by a data repeater item stored in memory and not previously visible on display 300 would be displayed below row 42 (row 42 still displayed by data repeater item 306). Thus display 300 would then display rows 41, 42 and 43 via data repeater items 304, 306 and a data repeater item (not shown) stored in memory. The data repeater item previously used to hold the data not displayed for row 39 may now be used to hold the undisplayed data for row 44.

Consider the following example. Suppose four (N) data repeater items are visible on a particular form display. In memory six (N+2) data repeater items may created in a scrollable container to store six rows of data from a data source, the six data repeater items representing the four data repeater items visible on the initial display and two data repeater items used for rapid display of the previous and next data rows.

Suppose the container in memory represents/stores the following information:
[data repeater item 1|row 77]
[data repeater item 2|row 78]
[data repeater item 3|row 79]
[data repeater item 4|row 80]
[data repeater item 5|row 81]
[data repeater item 6|row 82]

A control border may be displayed above and below the visible rows of data, as follows:
[data repeater item 1|row 77] not visible
[----control border----]
[data repeater item 2|row 78] visible
[data repeater item 3|row 79] visible
[data repeater item 4|row 80] visible
[data repeater item 5|row 81] visible
[----control border----]
[data repeater item 6|row 82] not visible In the example above, four data repeater items are in view on a display, bordered by a control border at the top and bottom of the display. Data repeater items 2, 3, 4 and 5 (rows 78, 79, 80 and 81) are visible on the example display. Two additional data repeater items (data repeater item 1 and data repeater item 6) may be created to handle a TAB through or normal scroll operation but are not now visible. If a current data repeater item is data repeater item 5 and a user presses TAB, in accordance with aspects of the subject matter disclosed herein, data repeater item 6 may scroll into view and data repeater item 1 may be moved down to the bottom and may be filled with row 83, thusly:
[data repeater item 2|row 78]
[----control border----]
[data repeater item 3|row 79]
[data repeater item 4|row 80]
[data repeater item 5|row 81]
[data repeater item 6|row 82]
[----control border----]
[data repeater item 1|row 83]

In the ending display in this example, data repeater items 3, 4, 5 and 6 (rows 79, 80. 81 and 82) are visible on the display and data repeater item 2 (row 78) and data repeater item 1 (row 83) are not visible on the display.

Considering again the original example:
[data repeater item 1|row 77]
[----control border----]
[data repeater item 2|row 78]
[data repeater item 3|row 79]
[data repeater item 4|row 80]
[data repeater item 5|row 81]
[----control border----]
[data repeater item 6|row 82]

Now suppose that the current item is data repeater item 2 and a user presses shift+TAB or scrolls up one data repeater item. In this case, in accordance with aspects of the subject matter disclosed herein, data repeater item 1 may scroll into view and data repeater item 6 may be moved up to the top and may be filled with row 76, thusly:
[data repeater item 6|row 76]
[----control border----]
[data repeater item 1|row 77]
[data repeater item 2|row 78]
[data repeater item 3|row 79]
[data repeater item 4|row 80]
[----control border----]
[data repeater item 5|row 81]

In the ending display in this example, data repeater items 1, 2, 3, and 4 (rows 77, 78, 79, and 80) are visible on the display and data repeater item 6 (row 76) and data repeater item 5 (row 81) are not visible on the display.

A second type of scrolling operation can be performed using an Up/Down operation or PageUp/PageDown operation. In this case, moving data repeater items as described above may result in flickering. Instead, in accordance with aspects of the subject matter disclosed herein, data repeater items may be filled with rows. For example, considering again the original example:

[data repeater item 1|row 77]
[----control border----]
[data repeater item 2|row 78]
[data repeater item 3|row 79]
[data repeater item 4|row 80]
[data repeater item 5|row 81]
[----control border----]
[data repeater item 6|row 82]

In response to receiving a PageDown operation, the following may result:

[data repeater item 1|row 81]
[----control border----]
[data repeater item 2|row 82]
[data repeater item 3|row 83]
[data repeater item 4|row 84]
[data repeater tern 5|row 85]
[----control border----]
[data repeater item 6|row 86]

That is, data repeater items may be re-populated with data reflecting the page up or page down operation. A group of data repeater items currently in the scrollable container in memory may be replaced with a new group of data repeater items reflecting the next or previous page of visible data. It will be appreciated that the associated child controls may be similarly reused.

Figure 4:
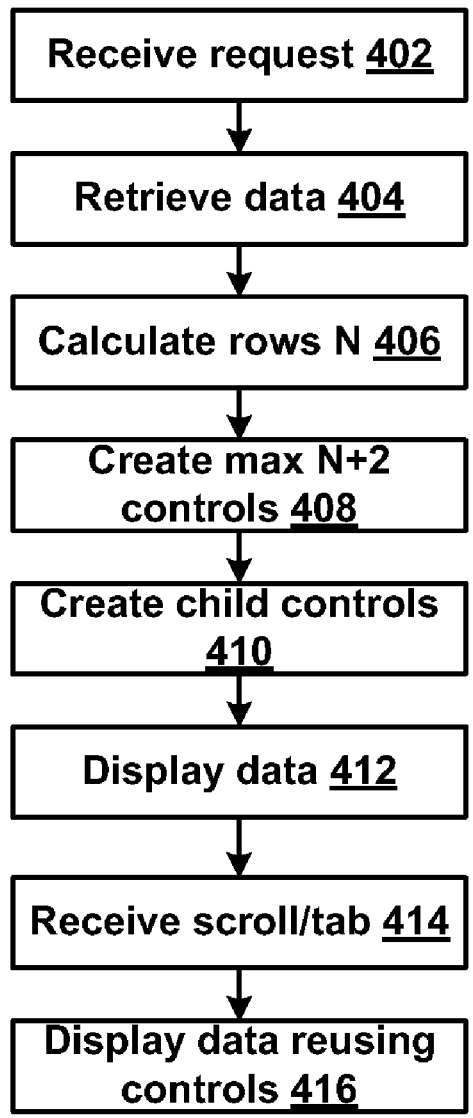
FIG. 4 is a flow diagram of an example of a method for rendering a customized list of controls in accordance with aspects of the subject matter disclosed herein.

FIG. 4 illustrates a method for rendering a customized list of controls in accordance with aspects of the subject matter disclosed herein. At 402 a request may be received from a user to display some data from a data source. The request may identify a particular record in a file or row in a database or other data source that the user is interested in viewing. At 404 the requested data may be retrieved from the data source. The data repeater control can calculate how many rows it can display in its view based on the size of the template and the size of the data repeater control itself. After connection to a datasource, the control can determine the number of rows of data in the data source to adjust the scrollbar. At 406 the number of rows of data that will fit on the display (N) may be calculated. A scrollable container for the data to be displayed may be created in memory or cache. The size of the scrollable container created may be a size that is sufficient to hold a maximum of N+2 rows of data if the row selected for viewing is not the first row or the last row in the data source. If the row selected for viewing is the first row or the last row in the data source, the size of the scrollable container created may be a size that is sufficient to hold N+1 rows of data. For each row of data to be stored in the scrollable container, a data repeater item may be created at 408. The retrieved data including the requested row and totaling N+2 or N+1 rows may be stored in the scrollable container in memory. Child controls for each field to be displayed of each row stored in the scrollable container may also be created.

At 410 for each field for each of the data repeater items, a child control may be created. At 412 the N rows may be displayed. If, for example, there are 91 rows of data in a data source and a request is received to display row 41, at 412, rows 40, 41 and 42 may be displayed. In cache but not visible on the screen rows 39 and 43 may be stored. Alternatively, rows 41, 42 and 43 may be displayed. In this case, in cache but not visible on the display rows 40 and 44 may be stored. At 414 a second user input may be received. User input may include a tab or scroll operation in an upward or downward direction. At 416 based on the input, the data on the display may be refreshed. In response to a second user input scrolling or tabbing up the last row displayed in the first display may disappear from view and the row previous to the first row of the first display may become visible. Similarly in response to a second user input scrolling or tabbing down, the first row on the first display may disappear and the last row on the first row may be followed by a new row on the second display. For example, suppose rows 39 and 43 are in cache, rows 40, 41 and 42 are displayed on a first display and a user scrolls up from row 40. Row 39 may be displayed as the first row of the second display, followed by rows 40 and 41, row 42 may remain in cache and the data repeater item that formerly held row 43 in cache may be reused and may subsequently hold row 38. The child controls for row 43 may also be reused for the child controls of row 38.

A data repeater control in accordance with aspects of the subject matter disclosed herein may also check a value inputted via the control to see if the value violates a rule associated with the data source. If, for example, an input does not respect a data source constraint, the value may not be allowed to be saved to the data source. For data sources which are data bases, the data repeater may check constraints on a data column or on a data row.

Example of a Suitable Computing Environment

Figure 5:
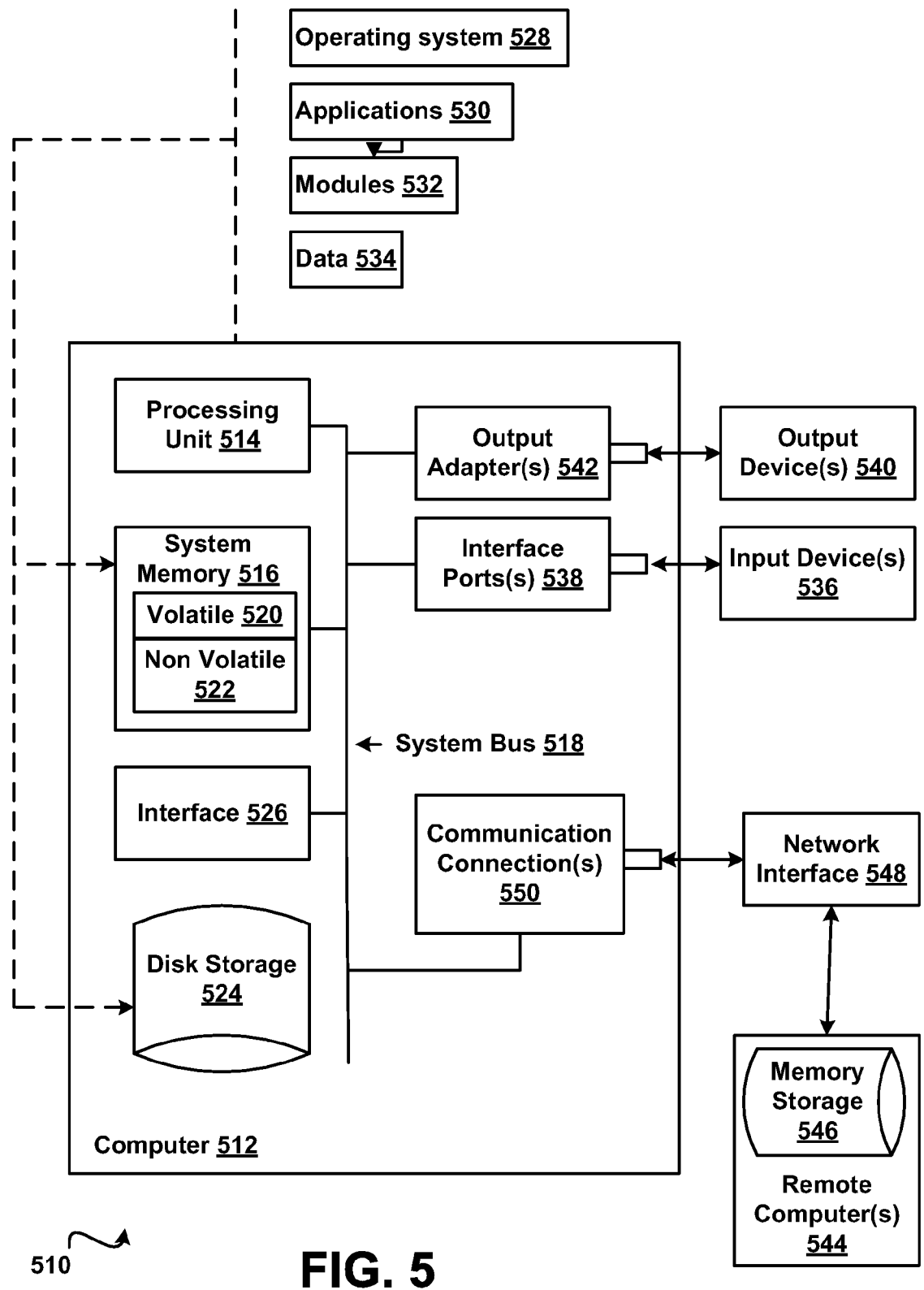
FIG. 5 is a block diagram illustrating an example of a computing environment in which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 5, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 5 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 6:
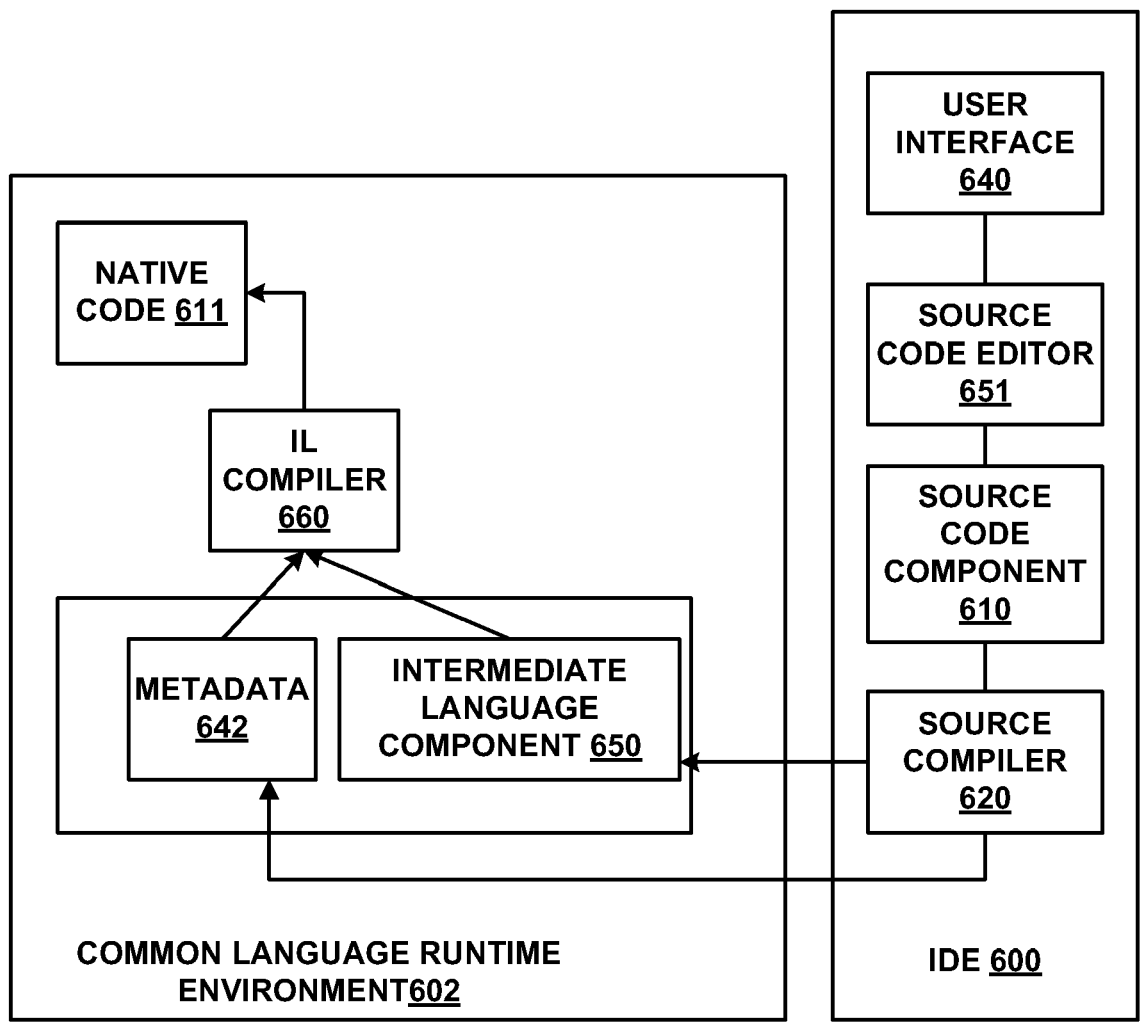
FIG. 6 is a block diagram of an example of an integrated development environment in accordance with aspects of the subject matter disclosed herein.

FIG. 6 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system for displaying rows of data from a data source comprising:
   a processor that displays a form on a display device, the form having N reusable form controls, the reusable form controls displaying rows of data from the data source without a form control for every row of data in the data source being stored in memory, N being a number of the reusable form controls visible on the form on the display device at a particular point in time; and
   the memory, which stores a minimum of N+1 and a maximum of N+2 reusable form controls in a scrollable container before the N rows of data are displayed on the display device, at least one of the form controls that are stored in the scrollable container being configured to be reused to display a next or previous row of data from the data source in response to a user input comprising a tab or scroll operation.

2. The system of claim 1, wherein a reusable form control of the reusable form controls comprises a data repeater control, wherein the data repeater control hosts child controls that display fields of a row of data from the data source.

3. The system of claim 2, wherein the child controls hosted by the data repeater control are reused in response to the user input comprising the tab or scroll operation.

4. The system of claim 1, wherein in response to a request to display a first row of the data source, the scrollable container is sized to store N+1 reusable form controls.

5. The system of claim 1, wherein in response to a request to display a last row of the data source, the scrollable container is sized to store N+1 reusable form controls.

6. The system of claim 1, wherein in response to receiving a scroll down or tab down request on a first display displaying N rows, the first display is replaced by a second display wherein a first displayed row of the N rows of the first display disappears from view on the second display and a last displayed row of the N rows of the first display is followed by a next displayed row on the second display, the next displayed row not displayed on the first display.

7. The system of claim 1, wherein in response to receiving a scroll up or tab up request on a first display displaying N rows, the first display is replaced by a second display, wherein a last displayed row of the N rows of the first display disappears from view on the second display and a first displayed row of the N rows of the first display is preceded by a previous displayed row on the second display, the previous displayed row not displayed on the first display.

8. A method of displaying data from a data source on a display device comprising:
   receiving input identifying a row of data from the data source to be displayed in a display;
   calculating a first number of rows N of the data from the data source that are viewable within the display at a particular point in time;
   creating a scrollable container in memory that includes a second number of rows of the data equal to a minimum of N+1 rows and a maximum of N+2 rows;
   displaying the N rows of the data from the data source in response to creating the scrollable container in the memory;
   creating a third number of data repeater items, the third number being equal to the second number, each of the data repeater items hosting child controls for fields of the respective rows in the scrollable container; and
   reusing the data repeater items and hosted child controls in response to user input comprising a scroll or tab operation.

9. The method of claim 8, further comprising:
   wherein in response to detecting a scroll down or tab down operation a data repeater item and its child controls are reused to store a next row.

10. The method of claim 8, further comprising:
    wherein in response to detecting a scroll up or tab up operation a data repeater item and its child controls are reused to store a previous row.

11. The method of claim 10, further comprising:
    displaying a first display comprising N data repeater items.

12. A computer-readable storage medium comprising computer-executable instructions which when executed cause a computing environment to:
    create a scrollable container in memory, the scrollable container configured to store a minimum of N+1 and a maximum of N+2 rows of data from a data source, N representing a number of rows of data that can be displayed at a particular point in time on a form on a display device, the form displayed on the display device comprising at least one data repeater item and a plurality of child controls hosted by the at least one data repeater item, the at least one data repeater item and the plurality of child controls configured to be reused in response to a scrolling or tabbing operation, and
    cause N rows of the data from the data source to be displayed in a first display from the scrollable container in response to storage of the minimum of N+1 and the maximum of N+2 rows of data from the data source in the scrollable container.

13. The computer-readable storage medium of claim 12, comprising further computer-executable instructions, which when executed cause the computing environment to:
    receive a request for a row of a data source to be displayed.

14. The computer-readable storage medium of claim 13, comprising further computer-executable instructions, which when executed cause the computing environment to:
    in response to receiving the request for the row of the data source to be displayed, retrieving data from the data source, the retrieved data comprising the requested row and storing the retrieved data in the scrollable container in memory.

15. The computer-readable storage medium of claim 12, comprising further computer-executable instructions, which when executed cause the computing environment to:
    calculate N.

16. The computer-readable storage medium of claim 12, comprising further computer-executable instructions, which when executed cause the computing environment to:
    receive a second user input comprising a scroll or tab operation, and in response to the received second user input, provide a second display wherein a row not visible on the first display is visible on the second display and wherein a row visible on the first display is not visible on the second display.

17. The computer-readable storage medium of claim 16, comprising further computer-executable instructions, which when executed cause the computing environment to:
provide the second display, wherein the row not visible on the first display and visible on the second display comprises a row previous to the first row on the first display in response to a user scroll up operation.

18. The computer-readable storage medium of claim 12, comprising further computer-executable instructions, which when executed cause the computing environment to:
provide the second display, wherein the row not visible on the first display and visible on the second display comprises a next row to the last row on the first display.

19. The computer-readable storage medium of claim 12, comprising further computer-executable instructions, which when executed cause the computing environment to:
create the scrollable container in memory, the scrollable container of a size sufficient to store a maximum of N+1 rows of data from a data source, in response to receiving a request for a first row or a last row of the data source.

* * * * *